United States Patent
Mulders

[15] 3,666,753
[45] May 30, 1972

[54] PROCEDURE FOR THE PREPARATION OF ALKYL SUBSTITUTED DIAZIRIDINES

[72] Inventor: Julien Mulders, Brussels, Belgium
[73] Assignee: Solvay & Cie, Brussels, Belgium
[22] Filed: May 29, 1969
[21] Appl. No.: 829,138

[30] Foreign Application Priority Data

May 30, 1968 Belgium .................................... 59 054

[52] U.S. Cl. ................. 260/239 AA, 260/250 A, 260/310 D
[51] Int. Cl. ................. C07d 45/00, C07d 49/02, C07d 51/02
[58] Field of Search ................... 260/239 AA, 310 D, 250 A

[56] References Cited

OTHER PUBLICATIONS

Ohme et al., Ber. Deut. Chem., Vol. 99, pages 2104– 2109 (1966).

*Primary Examiner*—Alton D. Rollins
*Attorney*—Robert E. Burns and Emmanuel J. Lobato

[57] ABSTRACT

Alkyl substituted diaziridines of the formula

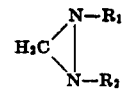

in which $R_1$ and $R_2$ may be the same or different lower alkyl groups and in which $R_1$ and $R_2$ may also be joined together to form a 5 or 6 membered ring, the carbon atoms of which ring may each be substituted with a methyl group are prepared by mixing formaldehyde, at least one alkyl amine and sodium hypochlorite in an aqueous alkaline medium and then extracting the aqueous mixture with an organic nitrogen containing solvent which is selected from the group which comprises nitrobenzene, aniline, γ-collidine, α-picoline, pyridine m-toluidine and quinoline and mixtures thereof to separate the resultant diaziridine from the aqeous mixture. The diaziridine product is obtained in high yield and purity after separation of the solvent.

10 Claims, No Drawings

PROCEDURE FOR THE PREPARATION OF ALKYL SUBSTITUTED DIAZIRIDINES

BACKGROUND OF THE INVENTION

The present invention relates to an improved process for preparing substituted diaziridines, particularly 1,2-dialkyl substituted diaziridines including bicyclic diaziridines.

It is well known that alkyl substituted diaziridines may be synthesized in various ways, including the reactions of: diazirines with organometallic compounds, imines with hydrazoic acid, carbonyl compounds with ammonia or amines and hydroxyl-amino-o-sulphonic acid, Schiff bases with chloramino or N-chloralkylamines, and carbonyl compounds with ammonia or amines and a source of chlorine.

Among all of the aforementioned processes, the last mentioned seems to be the simplest to carry out.

In the preparation of diaziridines from a carbonyl compound, ammonia or an amine and chlorine, gaseous chlorine is commonly employed as a source of chlorine. In this method, gaseous chlorine reacts with ammonia or an amine and a ketone or an aldehyde in the gaseous phase. In a variation of this process, chlorine and gaseous ammonia are bubbled into pure liquid ketone or into a solution of the ketone in an inert solvent or an ammoniacal solution. The employment of a solvent may be avoided by introducing the chlorine into a solution of the carbonyl compound in liquid ammonia.

It has also been found that gaseous chlorine can be replaced advantageously by an aqueous solution of sodium hypochlorite. In this process, an aqueous solution of sodium hypochlorite is reacted with a solution of ammonia and a carbonyl compound.

A similar mode of operation has been applied to the synthesis of 1,2-substituted diaziridines, i.e., diaziridines having alkyl substituents on the nitrogen atoms, by reaction of an amine with formaldehyde and sodium hypochlorite in an alkaline solution. This type of reaction has been described by R. Ohme, E. Schmitz and P. Dolge in Chem. Ber., 1966, 99 (7), pages 2104–2109, which publication is incorporated herein by reference. This method applies particularly to the synthesis of diaziridines of the formula

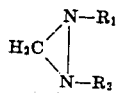

in which $R_1$ and $R_2$ are the same or different alkyl groups, each having one to four carbon atoms and in which $R_1$ and $R_2$ may also be joined together to form a bicyclic diaziridine.

This synthesis of 1,2-dialkyl diaziridine involves the following steps: an aqueous solution of formaldehyde is added to an alkaline solution of one or more aliphatic amines and then an aqueous solution of sodium hypochlorite is added thereto. After an adequate period of reaction, that is when the reaction appears to be complete, the reaction mixture is saturated with sodium hydroxide and the thus formed substituted diaziridine is extracted with ether or sometimes with methylene chloride. The product is then recovered by distillation.

This process has several major disadvantages. During the distillation of the extract to recover the product, the precipitation of solid material is observed. By employment of a nuclear magnetic resonance spectrometer it has been observed that in addition to the desired product, a secondary product of unknown structure is formed which is also extracted with ether. When the ethereal solution remains at room temperature for several hours, the spectrum of these extracts remains unchanged.

SUMMARY OF THE INVENTION

It has been discovered that the purity and yield of 1,2-dialkyl diaziridine prepared from formaldehyde, at least one amine and sodium hypochlorite are improved by the use of particular extraction solvents.

According to the present invention, substituted diaziridine of the formula

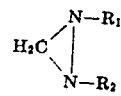

in which $R_1$ and $R_2$ may be the same or different alkyl groups each having one to four carbon atoms and $R_1$ and $R_2$ may also be joined together in a chain to form a polycyclic diaziridine, having a five- or six-membered ring, the three or four carbon atoms of which ring may each be substituted with a methyl group are prepared by a process which comprises mixing in an aqueous alkaline solution, formaldehyde, at least one alkyl amine and sodium hypochlorite to form the substituted diaziridine and then extracting this solution with at least one nitrogen containing organic solvent which is selected from a member of the group consisting of nitrobenzene, aniline, γ-collidine, α-picoline, pyridine, m-toluidine and quinoline. The diaziridine product is then obtained in improved yield and without the appearance of a secondary product by separation of the extracting solvent therefrom.

DESCRIPTION OF THE PREFERRED EMBODIMENTS

Amino compounds used in the present process include for example methyl amine, ethyl amine, propyl amine, isopropyl amine, butyl amine, isobutyl amine, 1,3-diamino butane and mixtures thereof. 1,2-Alkyl substituted diaziridines wherein the alkyl substituents are different are obtained by employing a mixture of two amino compounds.

Polycyclic diaziridine of the formula

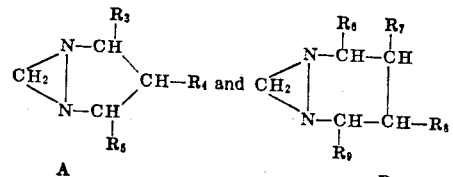

wherein $R_3$, $R_4$, $R_5$, $R_6$, $R_7$, $R_8$ and $R_9$ are methyl or hydrogen are obtained by use of the appropriate diamino compound. Thus, the use of 1,3-diamino propane in the present process yields the polycyclic diaziridine (A) containing a three- and five-member ring wherein each of $R_3$, $R_4$, and $R_5$ is hydrogen. Reaction of 1,3-diamino butane in the present process yields the polycyclic diaziridine (A) wherein $R_3$ is methyl and $R_4$ and $R_5$ are hydrogen. Likewise, the polycyclic diaziridine (B) containing a three-membered and a six-membered ring wherein $R_7$ and $R_8$ are methyl groups and $R_6$ and $R_9$ are hydrogen groups may be obtained by reaction of 1,4-diamino-2,3-dimethyl butane and so forth.

The reaction is generally carried out by adding a solution of sodium hypochlorite to an aqueous alkaline mixture of an amine and formaldehyde. Generally, the reaction is carried out at about room temperature or below, that is from about the freezing point of the solution to 26° C. with stirring. After the reaction is complete, prior to the extraction, the solution may be saturated with a salt such as sodium carbonate to facilitate the separation and extraction of the product.

According to the present invention, the reaction mixture is extracted with a nitrogen containing organic solvent which may be nitrobenzene, aniline and m-toluidine, quinoline, pyridine, α-picoline and collidines and mixtures of any of the foregoing.

Observation of the reaction mixture by means of a nuclear magnetic resonance spectrometer just prior to the extraction shows that a secondary unknown product is present in a substantial proportion; the concentration of the secondary product is at least 10 percent of the concentration of the desired 1,2-dialkyl substituted diaziridine. Immediately after the extraction of the alkyl substituted diaziridine according to the present invention, further observation by means of a nuclear magnetic resonance spectrometer indicates that the secondary unknown product has been extracted by the solvent. However, it has been found that in the solvents used for extraction in accordance with the present invention, the unknown, secondary product is transformed into the desired substituted diaziridine. This transformation has been verified by further observation over a period of time by means of a nuclear magnetic resonance spectrometer.

The transformation of the secondary unknown product into substituted diaziridine takes place at room temperature more or less rapidly. Generally the extract is permitted to remain at room temperature to effect the desired conversion for at least 5 hours. The extract can, of course, be permitted to remain at room temperature for an extended period of time, i.e., of 1, 2, or more days; in almost all cases however, the transformation is substantially complete after 24 hours, and no further change takes place even after 48 or more hours.

Subsequently, the diaziridine product is separated from the extracting solvent by distillation; by carrying out the process in accordance with the present invention, the formation of a solid during the distillation is no longer observed.

Thus, the present invention results in a double advantage. The purity of the product is improved and the yield of product is increased by the transformation of the impurity into the desired product.

Among the extraction solvents used according to the present invention, it is preferable to use those in which the reaction solution is less soluble in order to simplify the subsequent separations. The following solvents have been found to be particularly suitable in the present process, however the present process is by no means limited to these particular solvents; nitrobenzene, aniline, γ-collidine, α-picoline, pyridine, m-toluidine and quinoline. The following example is set forth to further illustrate the best mode contemplated for carrying out the present invention and demonstrate the remarkable results obtained thereby: however this example must not be construed as limiting the nature or scope of the invention in any manner whatsoever.

EXAMPLE

A. Preparation of 1,2-Diethyldiaziridine

To 34 g. of a solution containing 33 percent in weight of ethylamine (0.25 mole), there is successively added 0.25 mole of aqueous NaOH, 12.5 g. of a solution containing 30 percent formaldehyde (0.125 mole) and 75 cc. of a solution of 1.7 molar of sodium hypochlorite (0.125 mole). The solution is agitated for a period of 1 hour, while being kept at a temperature of about 20° C.; agitation of the mixture is continued at room temperature for a period of another hour and then the solution is allowed to rest. A yield of 1,2-diethyldiaziridine equal to 31 percent of the theoretic is determined by iodometric dosage. However, the nuclear magnetic resonance spectrum of the reaction medium shows the existence of a secondary product of unknown structure, the concentration of which is at least equal to 10% of the concentration in 1,2-diethyldiaziridine. The reaction mixture is saturated by means of sodium carbonate before extraction.

B. Extraction of 1,2-Diethyldiaziridine According to Previous Processes

Reaction mixtures prepared as described in part A are each extracted by means of the following solvents: ether, methylene chloride, trichloroethylene, perchloroethylene and monochlorobenzene. In each case, the unknown product together with 1,2-diethyldiaziridine is extracted into the organic phase. The extracts are permitted to sit for a period of 48 hours at room temperature, and the solutions are observed by means of a nuclear magnetic resonance spectrometer. No transformation of the by product into 1,2-diethyldiaziridine is found.

Each of the extracts is then distilled and during each distillation, the precipitation of a solid is observed.

C. Extraction According to the Invention

The solution prepared in part A is subjected to two extractions with one-fifth of its volume of nitrobenzene. The nuclear magnetic resonance spectrum of these extracts shows that the unknown product has been extracted into the organic phase. The extract is then permitted to remain at ambient temperature and is further observed by means of a nuclear magnetic resonance spectrometer, which shows that the byproduct is gradually transformed into 1,2-diethyldiaziridine; the transformation ends after 24 hours at ambient temperature. This transformation of the unknown product into 1,2-diethyldiaziridine presents a double advantage: the yield of 1,2-diethyldiaziridine is increased by at least 10 percent of its initial value and a pure product is obtained. During the distillation of the extracts, the precipitation of a solid is no longer observed.

Solutions prepared as described in part A were extracted with the following solvents: quinoline, aniline, pyridine, α-picoline and γ-collidine. In each case the byproduct was extracted together with the product and the byproduct was gradually transformed in the extract, at room temperature, to 1,2-diethyldiaziridine.

What I claim and desire to secure by Letters Patent is:

1. In a process of preparing alkyl substituted diaziridines of the formula

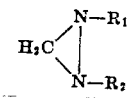

in which $R_1$ and $R_2$ may be the same or different alkyl groups having one to four carbon atoms and $R_1$ and $R_2$ may also be joined together to form a polycyclic having a five- or six-membered ring, the three or four carbon atoms of which ring may each be substituted with a methyl group, said process including the steps of reacting at least one alkyl amine with formaldehyde and sodium hypochlorite in an aqueous alkaline medium and then extracting the resultant diaziridine from the reaction mixture, the improvement comprising extracting said diaziridine from the reaction mixture with at least one nitrogen containing organic solvent selected from a member of the group consisting of nitrobenzene, aniline, γ-collidine, α-picoline, pyridine m-toluidine and quinoline.

2. Process in accordance with claim 1 in which the extract containing said diaziridine is maintained at ambient temperature for at least about 5 hours whereby byproduct formed during said reaction and extracted by said solvent with said diaziridine is converted into said diaziridine.

3. Process in accordance with claim 1 in which said solvent is selected from a member of the group consisting of nitrobenzene, aniline, γ-collidine, α-picoline, pyridine and quinoline.

4. Process according to claim 1 in which said alkyl amine is ethyl amine and in which the resultant product is 1,2-diethyldiaziridine.

5. Process according to claim 1 in which said alkyl amine is ethyl amine, and in which the product resulting from said reaction, 1,2-diethyldiaziridine is extracted with nitrobenzene.

6. Process according to claim 2 in which said substituted diaziridine is separated from said solvent by distillation.

7. A process for preparing an alkyl substituted diaziridne of the formula

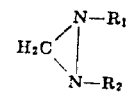

in which $R_1$ and $R_2$ may be the same or different alkyl groups having one to four carbon atoms and $R_1$ and $R_2$ may also be joined together to form a five- or six-membered ring, the three or four carbon atoms of which ring may each be substituted with a methyl group which comprises mixing in an aqueous alkaline medium formaldehyde, at least one alkyl amine and sodium hypochlorite to form said diaziridine, extracting the thus produced mixture with at least one nitrogen containing organic solvent selected from a member of the group which consists of nitrobenzene, aniline, γ-collidine, α-picoline, m-toluidine pyridine and quinoline to separate the thus-produced diaziridine therefrom and separating said solvent from said diaziridine.

8. Process in accordance with claim 7 in which the extract containing said diaziridine is maintained at ambient temperature for at least about 5 hours whereby by product formed during said reaction and extracted by said solvent with said diaziridine is converted into said diaziridine and in which said solvent is then separated from said diaziridine by distillation.

9. Process in accordance with claim 7 in which said solvent is selected from a member of the group consisting of nitrobenzene, aniline, γ-collidine, α-picoline, pyridine and quinoline.

10. Process according to claim 7 in which said alkyl amine is ethyl amine, and in which the product resulting from said reaction, 1,2-diethyldiaziridine is extracted with nitrobenzene.

* * * * *